May 21, 1963  H. V. SMITH  3,090,323
LIQUID SAMPLE PUMP ASSEMBLY
Filed Jan. 25, 1960  2 Sheets-Sheet 2
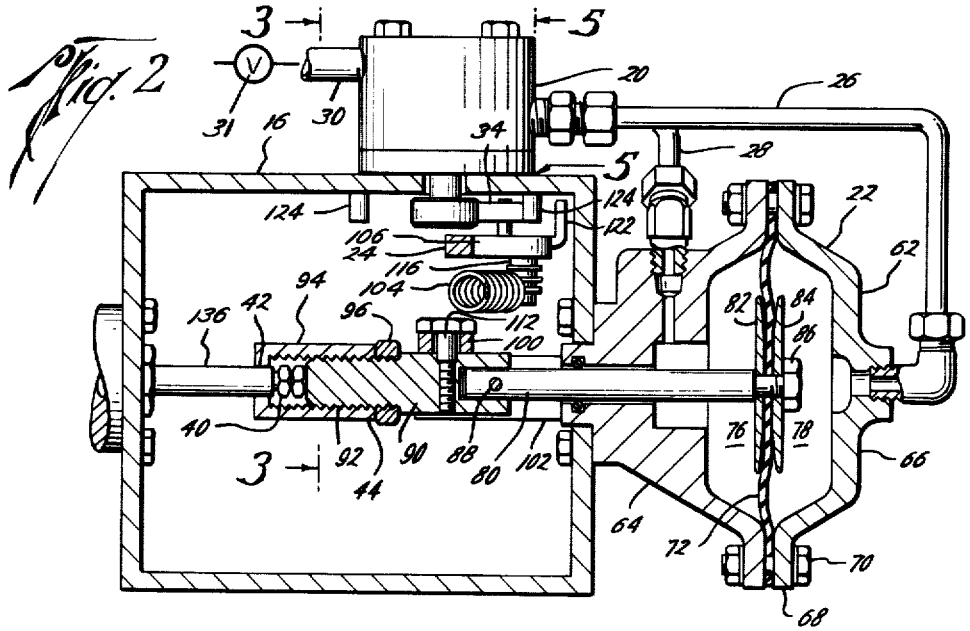
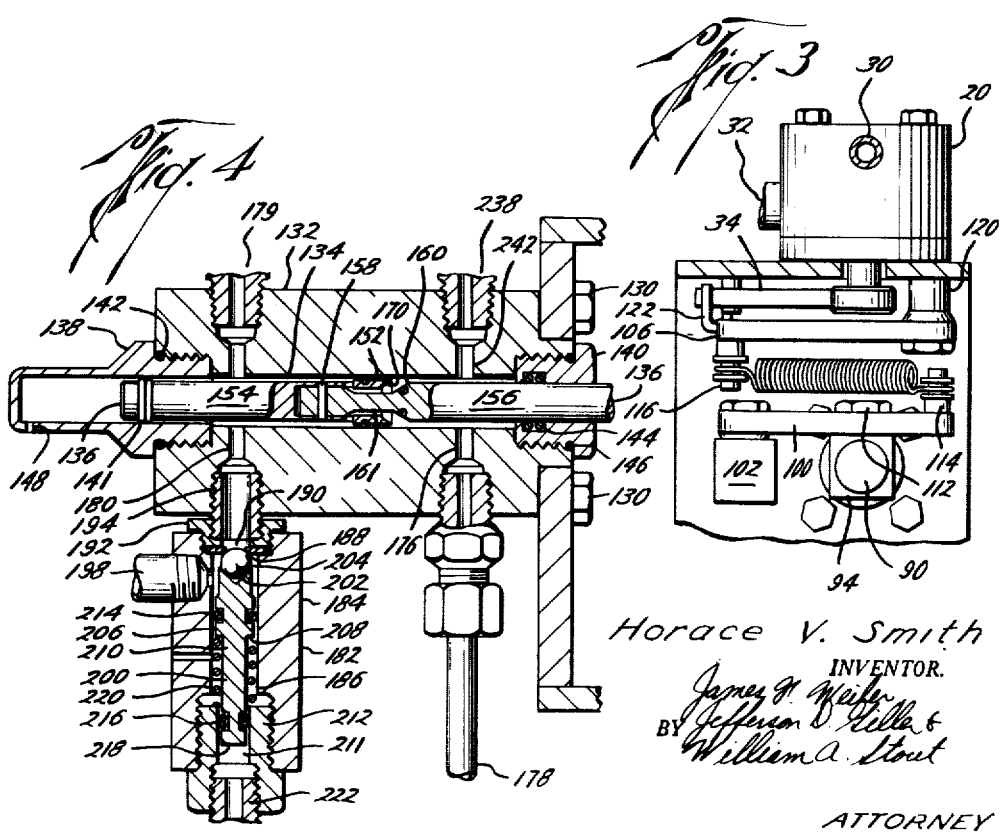
Horace V. Smith
INVENTOR.
BY James H. Weiler
Jefferson D. Giller
William A. Stout
ATTORNEY

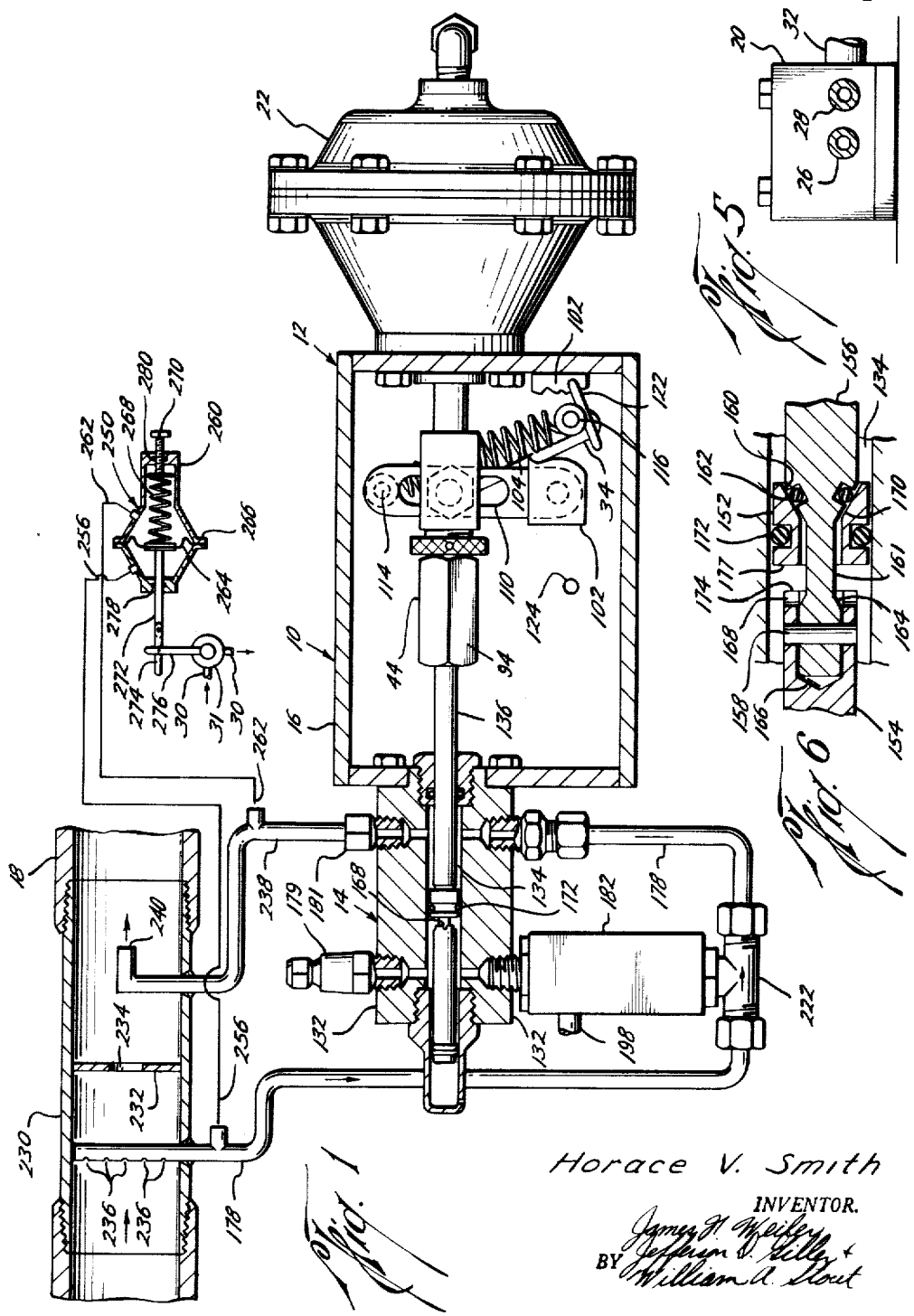

United States Patent Office 3,090,323
Patented May 21, 1963

3,090,323
LIQUID SAMPLE PUMP ASSEMBLY
Horace V. Smith, Houston, Tex., assignor to Metro Corporation, a corporation of Texas
Filed Jan. 25, 1960, Ser. No. 4,463
4 Claims. (Cl. 103—178)

This invention relates to a liquid sampler and more particularly to a sample pump assembly used to obtain representative samples from liquid under pressure.

Qualitative knowledge of the contents of a liquid in a container under pressure and especially flowing in a conduit is often desirable but difficult to obtain. To obtain a representative sample of liquid flowing in a conduit the rate at which the liquid is sampled should be proportional to the rate of flow of the liquid in the conduit.

It is therefore a general object of the present invention to provide an improved sampler adapted to withdraw, from liquid flowing in a conduit, uniform sized liquid samples at a rate which is proportional to the rate of flow of the liquid.

Another object of the present invention is to provide a sample pump assembly utilizing a piston pump in which the force required to operate the pump is approximately constant at all times regardless of variations in pressure within the container from which the sample is being withdrawn.

Another object of the present invention is to provide a sample pump assembly utilizing a hydraulically balanced piston pump and a balanced relief valve whereby the piston type pump does not work against the pressure of the liquid in the container from which the sample is taken and is not affected by it.

Another object of the present invention is to provide a sample pump assembly including a bypass flow means by which changes in quality in the liquid being sampled are reflected immediately in the sample and which bypass means prevents fouling of the pump assembly.

A still further object of the present invention is to provide a sample pump assembly which is economical to construct and operate and which is dependable in operation.

Other and further objects, features and advantages will be apparent from the following description of the presently preferred example of the present invention, given for the purpose of disclosure and taken in conjunction with the accompanying drawings where like character references designate like parts throughout the several views and where:

FIGURE 1 is an elevation, partly sectional and partly schematic, of a sampler constructed in accordance with the present invention, FIGURE 2 is a plan view of the power unit of the sampler of the present invention, FIGURE 3 is a view along the line 3—3 of FIGURE 2, FIGURE 4 is an enlarged fragmentary sectional view of a portion of the pump assembly of the present invention, FIGURE 5 is a view along the line 5—5 of FIGURE 2, and FIGURE 6 is an enlarged fragmentary view of a portion of the pump assembly of FIGURE 4.

Referring now to FIGURES 1 and 2, the liquid sampler 10 includes as a whole the power unit 12 which operates the pump assembly 14 to obtain samples of liquid from a container such as the conduit 18.

The power unit 12, the purpose of which is to operate the pump assembly 14, includes a rotary 4-way valve 20 mounted on a frame 16, a diaphragm assembly 22 mounted on the frame 16, and a snap acting mechanism 24. The 4-way pilot valve 20, upon operation of the valve actuating arm 34, directs fluid pressure from a supply line 30 alternately to one of the pressure lines 26 and 28 while it simultaneously drains pressure from the other pressure lines 26 and 28 out a vent 32 for operation of the diaphragm assembly 22 as later explained.

Pilot valves of this type, that is pilot valves which by actuation of a valve actuating arm will alternately direct pressure to one line while it vents pressure from the other line, are well known and readily available commercially so no further description of the pilot valve 20 is necessary.

The diaphragm assembly 22 includes a housing 62 having a base 64 and a bonnet 66 held together at the flanges 68 by the bolts 70. An imperforate flexible diaphragm 72 secured at its periphery by flanges 68 divides the diaphragm housing 62 into the right and left hand chambers 76 and 78 respectively. A connecting rod 80 slidably extends through the base 64 and is secured to the diaphragm 72 by the metal plates 82 and 84 on each side of the diaphragm 72 and the nut 86. The left end of the connecting rod 80 is secured by the pin 88 to one end of a stroke adjustment block 90 the other end of which is externally threaded at 92. A complementary internally threaded stroke adjustment sleeve 94 is threadedly secured to the stroke adjustment block 90 by the external threads 92 and is adjustably locked in position by the jam nut 96. This block 90, the sleeve 94, and the jam nut 96 form a stroke adjustment unit 44 adjustably connecting the connecting rod 80 to a piston rod 136. The right end of the piston rod 136 is slidably secured to the stroke adjustment sleeve 94 by lock nuts 40 within the sleeve 94 which nuts 40 are larger than the aperture 42 in the sleeve 94 through which the piston rod extends.

When the pilot valve 20 is operated to direct pressure through the line 26 and drain it from the line 28, the diaphragm chamber 78 will be pressured and the other diaphragm chamber 76 will be drained, forcing the diaphragm 72 and hence the connecting rod 80, stroke adjustment unit 44, and the piston rod 136 to the left. Upon operation of the pilot valve 20 to reverse the fluid flow in the lines 26 and 28 pressure is applied to diaphragm chamber 76 and drained from the diaphragm chamber 78 causing the diaphragm 72, the connecting rod 80, the stroke adjustment unit 44, and the piston rod 136 to move to the right.

The snap acting mechanism 24 oscillates the pilot valve actuating arm 34 of the pilot valve 20 to direct fluid pressure to the diaphragm assembly 22. As best shown in FIGURES 1, 2, and 3, the snap acting mechanism 24 includes a swing arm 100, pivotally mounted on a bar 102, and a spring 104 secured to the swing arm 100 and to a pivot arm 106 actuating the valve actuating arm 34. The swing arm 100 has a vertical slot 110 into which slidably fits an engaging bolt 112 threadily secured to the stroke adjustment block 90 so that upon reciprocating movement of the connecting rod 80 the swing arm 100 is swung from side to side through its contact with the bolt 112.

One end of the spring 104 is secured to the free end of the swing arm 100 at end 114 and the other end is secured to the pivot arm 106 at the pin 116. The pivot arm 106 is pivotally mounted by the shaft 120 in the frame 16. Secured to and projecting from the lower end of the pivot arm 106 is a pair of spaced projections 122 forming contact members that straddle the pilot actuating arm 34 of the pilot valve 20 and strike the pilot actuating arm 34 when the pivot arm 106 is moved from side to side thereby moving the pilot actuating arm 34 and actuating the pilot 20. The tension spring 104 is connected to the swing arm 100 at the pin 114 having its axis on one side of the axis of the shaft 120 forming the pivot point of the pivot arm 106 and is connected to the pivot arm 106 on the other side of the shaft or pivot point 120. Thus the tension of the spring 104 tends to hold the pivot arm 106 on whatever side of the shaft 120 the upper end of the pin 114 happens to be at that time.

To prevent the pivot arm 106 from damaging the pilot valve 20 when the pilot actuating arm 34 is thrown from side to side by the projections 122, a pair of stops 124 extend outwardly from the frame 16 on each side of the pilot actuating arm 34. These stops 124 are spaced so that the pilot actuating arm 34 has sufficient movement to operate the pilot valve 20, but are placed close enough together to prevent damage to the valve.

In operation of the snap acting mechanism, the engaging bolt 112 is reciprocated by movement of the connecting rod 80 causing a swinging movement of the swing arm 100 first in one direction and then in the other. As the swing arm 100 moves from one side to another, tension on the spring 104, when it passes the straight line through the shaft 120 and the pin 116, snaps the pivot arm 106 from one extreme position to the other. As the pivot arm 106 is oscillated on its shaft 120 the projections 122 strike the pilot actuating arm 34 actuating the pilot valve 20 to alternately direct fluid pressure to one of the lines 26 and 28 while simultaneously draining it from the other.

As thus constructed, a supply of fluid pressure in the pressure line 30 is alternately directed to one of the lines 26 and 28 and drained from the other by operation of the pilot valve 20, causing reciprocation of the diaphragm 72 and hence of the connecting rod 80, which connecting rod 80 in turn actuates the snap acting mechanism 24 to operate the pilot valve 20. Control of fluid pressure to the pilot valve 20 by a throttle valve 31 in the supply line 30 controls the speed of actuation of the diaphragm 72 and hence the rate of reciprocation of the piston rod 136.

Referring now to FIGURES 1, 4, and 6 there is illustrated the pump assembly 14 of the present invention. Secured to the frame 16 such as by the bolts 130 is the cylinder or body 132 in the bore 134 of which is loosely received the piston rod 136 which extends from both ends of the cylinder 132 through the stuffing boxes 138 and 140 at the left and right ends respectively, as viewed in FIGURE 4. Packing such as the combination of O-rings and anti-extrusion rings 141 and 144 between the cylinder 132 and the piston rod 136 and the O-rings 142 and 146 between the stuffing boxes 138 and 140 and the cylinder 132 prevent the escape of fluid from within to without the cylinder along the piston rod 136. The left end of the piston rod 136, as viewed in FIGURE 4, is open to the atmosphere through the vent 148 in the stuffing box 138 and the right end is connected to the stroke adjustment unit 44.

Within the bore 134 of the cylinder 132 and on the piston rod 136 is a hollow piston 152 (FIGURE 6) which is slideable with respect to a limited portion of the piston rod 136. For ease of construction in forming this limited portion of the piston rod 136 with respect to which the piston 152 is slideable, the piston rod 136 is constructed of two pieces 154 and 156 respectively held together by the pin 158. The right hand portion 156 of the piston rod 136 is reduced in diameter by the inwardly tapering shoulder forming the valve surface 160 in which valve surface 160 is located the O-ring 162. To the left of the valve seating surface 160, as viewed in FIGURE 4, is a reduced diameter portion 161 which is increased in diameter again by the outwardly directed tapered shoulder 164 fitting into a counterbored portion 166 of the left hand portion 154 of the piston rod 136. The piston 152 has an internal diameter greater than the external diameter of the reduced portion 161 of the piston rod 136. The right end of the left hand portion 154 of the piston rod 136 extends over the tapered shoulder 164 and is provided at its outer end with a series of escape ports 168 extending over the tapered shoulders 164 so that liquid between the reduced diameter portion 161 and the piston 152 may escape into the bore 134 of the cylinder 132 through these ports 168.

At the right end of the piston 152 are tapered shoulders forming a valve surface 170 adapted to sealingly engage the valve surface 160 on the piston rod 136. An O-ring 172 in the exterior of the piston 152 snugly fits the bore 134 and prevents the escape of liquid between the exterior of the piston 152 and the bore 134.

Near the right end of the cylinder 132 is a liquid inlet passageway 176 into which is threadedly secured a liquid inlet line 178. Axially spaced along the cylinder 132 from the liquid inlet port and on the other side of the piston 152 from the liquid inlet passageway 176 is a liquid outlet passageway 180. Communicating with the bore 134 is the gas vent 179 to bleed accumulated gas from the bore 134.

As thus constructed, liquid entering the liquid inlet line 178 fills the bore 134 around the piston rod 136 and is forced out the outlet passageway 180. When the piston rod 136 is moved through its pumping stroke, that is from right to left as viewed in FIGURE 1, the hollow piston 152 will remain stationary due to the friction between it and the cylinder 132 until the valve seating surfaces 170 and 160 on the piston 152 and the piston 136 meet. The piston 152 is then carried to the left by the contact of these valve surfaces 170 and 160 forcing any liquid in the bore 134 to the left of the piston 152 out the liquid passageway 180 because the liquid cannot escape past the piston 152.

When the piston rod 136 is moved through its retracting stroke, that is from left to right, the valve surfaces 170 and 160 immediately unseat due to the frictional drag of the piston 152 in the cylinder 134 and the piston 152 will remain stationary until its shoulder 177 is contacted by the shoulder 174 of the piston rod 136 whereupon the piston 152 will be carried to the right. During this movement to the right the piston 152 is moved through liquid in the bore 134 around the piston rod 136 by permitting liquid to pass through the escape ports 168. Upon movement of the piston rod 136 to the left this liquid which has passed through these escape ports 168 is then forced out the liquid outlet passageway 180 by the piston 152.

The body or cylinder 132, its bore 134, the piston rod 136, and the piston 152 comprise the piston pump of the pump assembly 14.

Because the liquid in the inlet line 178 and hence the bore 134 is under pressure, the liquid would squirt out the outlet passageway 180 when the piston rod 136 is being moved to the right if there were not some means to prevent this. This action is prevented by providing at the outlet passageway 180 a balanced relief valve 182.

The balanced relief valve 182 (FIGURE 4) has an elongate body 184 containing an axial bore 186 partially closed near its upper end by a valve seat 188 having an aperture 190 therein which valve seat 188 is held in position by the lock nut 192. An externally threaded hollow plug 194 threaded into matching threads in the cylinder 132 and in the lock nut 192 secures the balanced relief valve 182 to the cylinder 132 and allows liquid in the outlet passageway 180 to reach the aperture 190 in the valve seat 188. A sample outlet passageway 198 communicates between the exterior of the block 184 and the bore 186 of the relief valve 182 so that a flow passage is formed by the outlet passageway 180, the plug 194, the aperture 190, the upper end of the bore 186, and the sample outlet 198. A container, not shown, may be connected to the sample outlet 198 to catch the liquid sample as it comes from the pump assembly 14.

Slideably mounted within the bore 186 of the relief valve 182 is a valve stem 200 having at its upper end a ball seat 202 into which fits a stem ball 204 which stem ball 204, when moved upwardly by the valve stem 200, sealingly fits against the valve seat 188 closing the aperture 190. The valve stem 200 and stem ball 204 together comprise a valve member 206.

The lower portion of the valve stem 200 is reduced in diameter at the shoulder 208 to form a reduced diameter portion 210, the lower end of which slideable extends into the bore 211 of a hollow plug 212 threadedly secured in the lower end of the bore 186. Escape of liquid along the valve stem 200 is prevented by the O-ring 214 above the shoulder 208 and the combination O-ring and anti-extrusion ring 216 on the valve stem 200 within the bore 211 of the plug 212. The valve member 206 is continuously urged upwardly to close the aperture 190 by the action of a coil expansion spring 220 around the reduced diameter portion 210 of the valve stem 200 which spring 220 is abutted at its upper end against the shoulder 208 and at its lower end against the plug 212.

A T-connection 222 in the liquid inlet line 178 (FIGURE 1) communicates with the bore 211 of the plug 212 so that liquid enters the bore 211 of the plug 212 at approximately the same pressure that it enters the bore 134 of the cylinder 132. Liquid under pressure entering the bore 211 acts against the surface 218 of the lower end of the valve member 206, urging the valve member 206 upwardly to close the aperture 190. The portion of the bore 211 of the plug 212 that is exposed to liquid from the T-connection 222 is a valve closing chamber as the pressure of liquid in this chamber tends to close the relief valve 182.

The area of the surface 218 at the lower end of the valve member 206 is approximately equal to the area of the aperture 190 so that the surface 218 in the valve closing chamber and the surface of that portion of the stem ball 204 of the valve member 206 exposed in the aperture 190 when it is closed, are opposed and approximately equal in area.

Referring now to FIGURE 1, a tubular sample nipple 230 is axially secured in the conduit 18 so that liquid in the conduit 18 flows through the sample nipple 230. Extending across the sample nipple 230 is an orifice plate or member 232 having therein a restricting orifice 234. Upstream of the orifice plate 232 the liquid inlet line 178 enters the sample nipple 230 and extends across it. The portion of the liquid inlet line 178 within the nipple 230 is perforated at 236 along its length to allow a representative liquid sample in the sample nipple 230 to enter the liquid inlet line 178. Downsteam of the orifice plate 232 a liquid bypass line 238 extends into the sample nipple 230 and has its free end 240 directed downstream of the liquid flowing in the sample nipple 230. The other end of the bypass line 238 communicates with the bore 134 in the cylinder 132 through a liquid bypass passageway 242.

As thus constructed, pressure of liquid flowing in the sample nipple 230 downstream of the orifice plate 232 is less than the pressure upstream of it so that liquid entering the liquid inlet line 178 and not pumped out the bore 134 of the cylinder 132 will return to the sample nipple 230 and hence the conduit 18 through the bypass line 238.

In FIGURE 1 there is also illustrated a throttle control 250 connected to the conduit 18 and to the throttle valve 31 which throttle control 250 operates a throttle valve 31 in response to changes in rate of flow of liquid in the conduit 18 so that the throttle valve 31 is opened proportionally to the rate of flow of the liquid in the conduit 18, that is, the throttle valve 31 opens as the rate of flow increases and closes as the rate of flow decreases. By such operation the speed of actuation of the diaphragm 72 and hence the rate of reciprocation of the piston rod 136 is proportional to the rate of flow of liquid in the conduit 18.

A liquid pressure line 256, branching from the liquid inlet line 178, communicates between the interior of the liquid conduit 18 at a point upstream of the orifice member 232 and the interior of the housing 258 of a diaphragm actuator 260. Another pressure line 262, branching from the liquid bypass line 238, communicates between the interior of the liquid conduit 18 downstream of the orifice member 232 and another point on the housing 258.

Within the housing 258 of the diaphragm actuator 250 is a movable member formed of the imperforate flexible diaphragm 264 secured in the liquid tight housing 258 at its outer edges by the flanges 266. The diaphragm 268 is continuously urged to the left by the compression spring 268 which has its compressive force against the diaphragm 264 adjusted by the bolt 270 against which one end of the spring 268 rests. The diaphragm 264 is operatively connected to the throttle valve 31 by the valve actuating arm 276 of the throttle valve 31 and the pitman rod 272, including a pivoted link 274. Stuffing boxes 278 and 280 are provided in the housing 258 at the pitman arm 272 and the bolt 270 to prevent the escape of fluid from within the housing 258.

Throttling valves such as the throttling valve 31 here illustrated are conventional items easily available on the market and no further description of them is necessary. Such valves open a flow passage through them in proportion to movement of an actuating member such as the actuating lever 276 and close the flow passage proportionately to the amount of movement of the actuating member in the other direction.

As thus constructed, when the rate of flow of liquid in the conduit increases the differential in pressure between the upstream and downstream side of the orifice member 232 will increase thereby increasing the pressure differential between the pressure lines 256 and 262 with the downstream pressure line 262 having the lesser pressure. This will increase the pressure on the left side of the diaphragm 264 relative to the pressure on the right side of the diaphragm and cause the diaphragm 264 to move to the right carrying with it the pitman arm 272 thereby opening the throttle valve 31 in the pressure line 30 to the pilot valve 20 causing an increase in the speed of reciprocation of the diaphragm 72 within the diaphragm assembly 22 and hence of the piston rod 136. If the rate of flow of liquid in the conduit 18 decreases, the pressure differential between each side of the orifice member 232 will decrease resulting in a lessening of the pressure differential between the two sides of the diaphragm 264 so that the diaphragm 264 is moved to the left by the action of the spring 268. This movement of the diaphragm 264 to the left moves the pitman arm 272 to the left closing the throttle valve 31 in the pressure line 30 thereby decreasing the speed of reciprocation of the piston rod 136.

If desired, the throttle control 250 may be omitted and the throttle valve 31 actuated manually.

In operation of the liquid sampler 10, the sample nipple 230 is placed in the conduit 18 and the throttle control 250 is adjusted to open the throttle valve 31 the amount necessary to give the desired rate of sampling of liquid at the then rate of flow in the conduit 18. The desired size of the sample obtained on each pumping stroke of the piston rod 136 is determined by adjustment of the length of the stroke of the piston rod 136 which adjustment is made by threading or unthreading the stroke adjustment sleeve 94 on the stroke adjustment block 90 thereby increasing or decreasing the lost motion of the lock nuts 40 between the aperture 42 in the sleeve 94 and the end of the stroke adjustment block 90.

Liquid continuously enters the liquid inlet line 178 from the nipple 230, passes across the bore 134 of the cylinder 132, enters bypass line 238, and returns to the sample nipple 230 regardless of whether or not the pump is being actuated as this bypass action results from the pressure differentials on each side of the orifice plate 232 and not from the actuation of the pump. By this circulating bypass representative samples of liquid actually passing through the conduit 18 are quickly brought into the bore 134 so that it is not necessary to pump out the entire contents of the inlet line 178 before a change in content of liquid within the conduit 18 is placed in the bore 134.

As the piston rod 136 is moved to the right it carries the piston 152 to the right with it through the liquid in the bore 134 in the manner previously described. Upon movement of the piston rod 136 to the left, the valve surfaces 170 and 160 on the piston 152 and the piston rod 136, respectively, meet, so that liquid to the left of the piston 152 is forced out the liquid outlet passageway 180 causing the valve member 206 to move downwardly against the action of the compression spring 220.

This opens the relief valve 182 and forces liquid out the sample outlet 198. Upon movement again to the right of the piston rod 136, the force of the pump on the liquid acting on top of the valve member 206 is withdrawn and the relief valve 182 is closed by the compression spring 220 moving the valve member 206 upwardly. Upon completion of the movement of the piston rod 136 to the right the piston rod 136 is placed in position for another pumping stroke.

During each pumping stroke the force operating the piston rod 136 does not operate against the pressure of the liquid being sampled and is not influenced by changes in it. The first reason for this is that the pressure of the liquid entering the valve closing chamber of the relief valve 182 and the bore 134 are approximately the same. Because the area of the surface 218 within the valve closing chamber is approximately equal to the opposed surface of the valve member 206 at the aperture 190, the forces tending to move the valve member 206 axially are approximately equal except for the compression spring 220. Thus, regardless of the pressure of the liquid within the conduit 18, the force required to operate the piston 136 to force the liquid sample out the sample outlet 198 will not vary.

The second reason that the force operating the piston rod 136 does not operate against the pressure of the liquid and is not influenced by changes in it is that neither end of the piston rod 136 is exposed to the pressure of the conduit 18 so the power unit does not have to overcome the resistance of such pressure and variations of pressure within the conduit 18 have no effect on the force needed to reciprocate the piston rod 136.

When the rate of flow of liquid in the conduit 18 increases it will cause the throttle control 250 to open the throttle valve 31 more and cause the pump assembly to be actuated faster and thereby take samples at a faster rate. If the rate of flow of liquid in the conduit 18 decreases it will cause the throttle control 250 to close the throttle valve proportionally and slow the rate of sample taking.

The present invention, therefore, is well suited to carry out the objects and attain the advantages and ends mentioned as well as others inherent therein. Rearrangements of parts of substitution of parts will suggest themselves to those skilled in the art and, accordingly, the invention is to be limited only by the spirit thereof and the scope of the appended claims.

What is claimed is:

1. In a pump for taking samples of liquid from a liquid container the improvement comprising, a body having a bore extending therethrough, a stuffing box at each end of the bore, a piston rod loosely received in the bore and sealingly and slidably extending through each stuffing box, a hollow piston on the piston rod within the bore and slidable with respect to a limited portion of the piston rod, said piston having an external portion snugly and slidably fitting the bore, and an internal diameter greater than the external diameter of said portion of the piston rod, mating valve surfaces on the limited portion of the piston rod and the piston adapted to sealingly engage each other upon movement of the piston rod in a first direction and to separate upon movement of the piston rod in a second direction, a passageway for liquid communicating between the bore and a point on said limited portion of the piston rod spaced from the valve surfaces, a liquid inlet line to and a liquid outlet line from the bore at axially spaced points along the bore, and a relief valve in the liquid outlet line, said relief valve having a flow passageway communicating between the liquid outlet line and the exterior of the relief valve, a movable valve member in the relief valve adapted upon alternate movement to open and close the liquid passageway, a valve closing chamber in fluid communication with the valve member so that application of fluid pressure to the valve closing chamber urges the valve member to close the flow passageway, resilient means urging the valve member to close the flow passageway, and a liquid conduit between the valve closing chamber and the liquid inlet to the pump.

2. In a sample pump assembly for pumping samples of liquid from a liquid container the improvement comprising, a body having a bore extending therethrough, a stuffing box at each end of the bore, a piston rod in the bore and sealingly and slidably extending through each stuffing box, a piston in the bore and operatively connected to the piston rod, valve means on at least one of the piston and piston rod permitting flow of fluid past the piston in the bore upon movement of the piston in one direction and preventing movement of fluid past the piston upon movement of the piston in an opposite direction, a liquid inlet line to and a liquid outlet line from the bore at axially spaced points along the bore on opposite sides of the piston, and a relief valve in the liquid outlet line, said relief valve having a flow passageway communicating between the liquid outlet line and the exterior of the relief valve, a movable valve member in the relief valve adapted upon alternate movement to open and close the liquid passageway, a valve closing chamber in fluid communication with the valve member so that application of fluid pressure to the valve closing chamber urges the valve member to close the flow passageway, resilient means urging the valve member to close the flow passageway, and a liquid conduit between the valve closing chamber and the liquid inlet line to the pump.

3. The improvement of claim 2 in which the valve member has opposed surfaces of approximately equal area exposed to the valve closing chamber and an aperture in the flow passageway respectively.

4. The improvement of claim 1 in which the valve member has opposed surfaces of approximately equal area exposed to the valve closing chamber and an aperture in the flow passageway respectively.

References Cited in the file of this patent

UNITED STATES PATENTS

| | | |
|---|---|---|
| 1,477,381 | Palm | Dec. 11, 1923 |
| 2,229,519 | Pate, et al. | Jan. 21, 1941 |
| 2,277,714 | Polston, et al. | Mar. 31, 1942 |
| 2,350,323 | Cochran, et al. | June 6, 1944 |
| 2,396,878 | Plumb | Mar. 19, 1946 |
| 2,693,114 | Tapp, et al. | Nov. 2, 1954 |
| 2,696,785 | Blue | Dec. 14, 1954 |
| 2,761,391 | Johnston | Sept. 4, 1956 |
| 2,836,119 | Kugler | May 27, 1958 |

FOREIGN PATENTS

| | | |
|---|---|---|
| 24,616 | Great Britain | of 1895 |

UNITED STATES PATENT OFFICE
CERTIFICATE OF CORRECTION

Patent No. 3,090,323

May 21, 1963

Horace V. Smith

It is hereby certified that error appears in the above numbered patent requiring correction and that the said Letters Patent should read as corrected below.

In the grant, lines 2 and 11, and in the heading to the printed specification, lines 3 and 4, name of assignee, for "Metro Corporation", each occurrence, read -- Metrol Corporation --.

Signed and sealed this 25th day of February 1964.

(SEAL)
Attest:
ERNEST W. SWIDER

Attesting Officer

EDWIN L. REYNOLDS

Acting Commissioner of Patents